United States Patent
Gau et al.

(10) Patent No.: US 9,286,330 B2
(45) Date of Patent: Mar. 15, 2016

(54) MIGRATION OF DATA OBJECTS

(71) Applicant: ORACLE INTERNATIONAL CORPORATION, Redwood Shores, CA (US)

(72) Inventors: Johnny Gau, Fremont, CA (US); Irene Fan, Saratoga, CA (US); Rajan Mahendrakumar Modi, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 299 days.

(21) Appl. No.: 13/894,755

(22) Filed: May 15, 2013

(65) Prior Publication Data

US 2014/0344313 A1 Nov. 20, 2014

(51) Int. Cl.
  *G06F 7/00* (2006.01)
  *G06F 17/00* (2006.01)
  *G06F 17/30* (2006.01)

(52) U.S. Cl.
  CPC .................... *G06F 17/303* (2013.01)

(58) Field of Classification Search
  CPC ............ G06F 17/303; G06F 17/30867; G06F 17/30864; G06F 17/30547
  USPC ........................................ 725/36; 455/414.1
  See application file for complete search history.

(56) References Cited

U.S. PATENT DOCUMENTS

| | | | |
|---|---|---|---|
| 8,285,762 B2 | 10/2012 | Cannon et al. | |
| 8,316,065 B2 | 11/2012 | Nemoto et al. | |
| 8,818,949 B2 * | 8/2014 | Cline et al. | 707/638 |
| 2007/0260476 A1 * | 11/2007 | Smolen et al. | 705/1 |
| 2007/0260575 A1 * | 11/2007 | Robinson et al. | 707/1 |
| 2008/0307454 A1 * | 12/2008 | Ahanger et al. | 725/36 |
| 2010/0100456 A1 * | 4/2010 | West | 705/27 |
| 2010/0120402 A1 * | 5/2010 | Sethi et al. | 455/414.1 |
| 2013/0007387 A1 | 1/2013 | Sakaguchi et al. | |

* cited by examiner

*Primary Examiner* — Susan Chen
(74) *Attorney, Agent, or Firm* — Miles & Stockbridge P.C.

(57) ABSTRACT

A system for migrating first data objects from a first repository product to a second repository product exports the first data objects from the first repository product into a schema. The schema describes a logical model of the first data objects. The system maps the first data objects to second data objects of the second repository product. The system trims the first data objects. Trimming comprises performing data modification on the first data objects so that the first data objects can be migrated to the second repository product. The system also creates placeholders for the first data objects for later deployment binding.

19 Claims, 4 Drawing Sheets

MIGRATION OF DATA OBJECTS

FIELD

One embodiment is directed generally to a computer system, and in particular to a computer system that migrates data objects from a first repository product to a second repository product.

BACKGROUND INFORMATION

A software product, such as a repository product (e.g., a database), may use a particular technology stack to provide the software solution's specific functionality. A technology stack may be generally understood as the layers of components or services that are used to provide the specific functionality of the software product. As a software product is updated, the technology stack of the updated/new software product is generally very similar to the technology stack of the original software product.

However, in some cases, a new software product can be a complete software rewrite of the original software product. For example, in some cases the new software product may use a new technology stack that is substantially different than the original technology stack of the original software product. For example, Oracle "Enterprise Repository 12c" from Oracle Corporation uses a technology stack that is substantially different than the previous software product, "Oracle Enterprise Repository 11g." A user may wish to migrate/transfer data objects from an original software product to a new software product.

SUMMARY

One embodiment is a system for migrating first data objects from a first repository product to a second repository product. The system exports the first data objects from the first repository product into a schema. The schema describes a logical model of the first data objects. The system maps the first data objects to second data objects of the second repository product. The system trims the first data objects. Trimming comprises performing data modification on the first data objects so that the first data objects can be migrated to the second repository product. The system also creates placeholders for the first data objects for later deployment binding.

DETAILED DESCRIPTION

Figure 1:
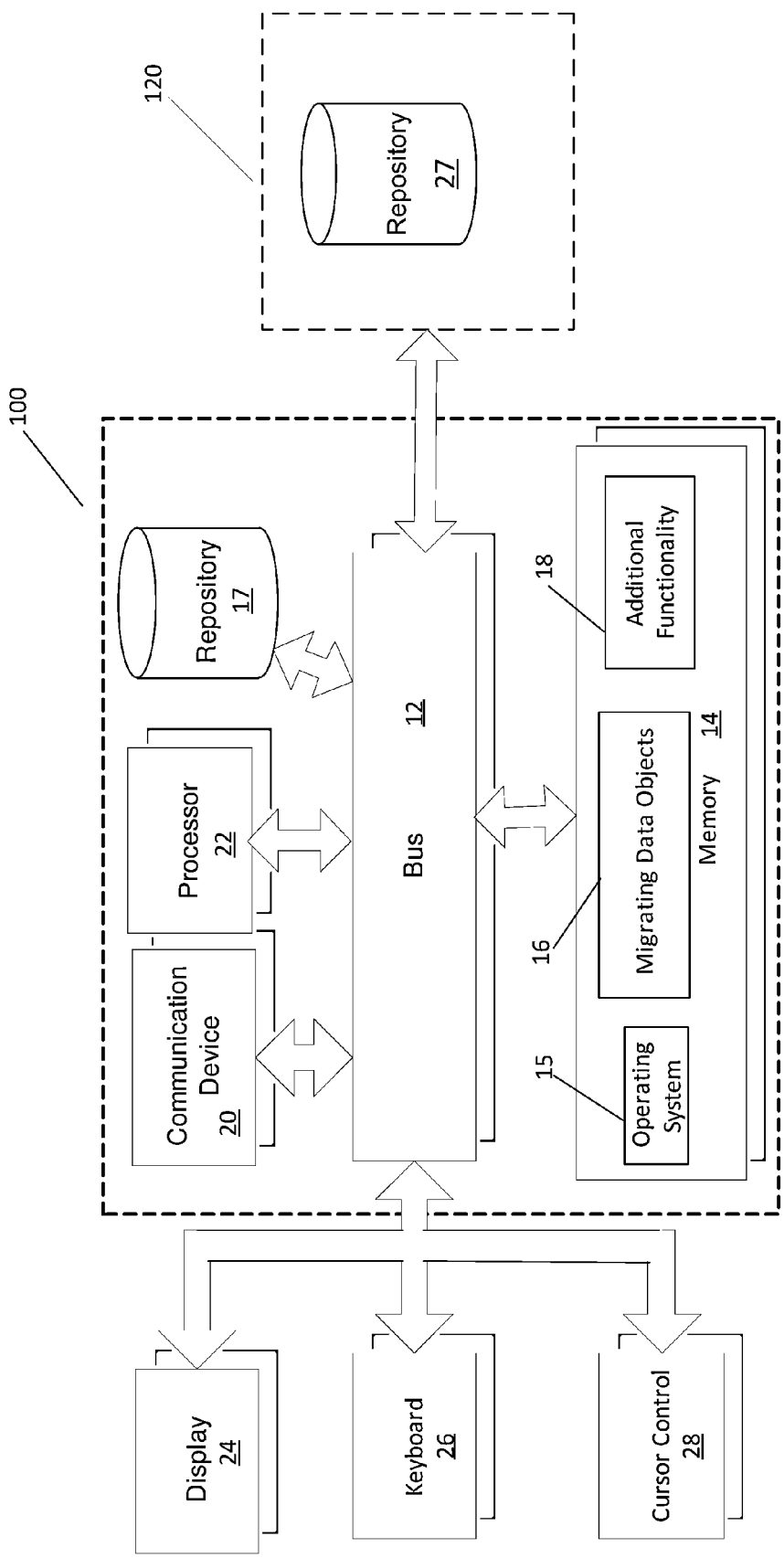
FIG. 1 is an overview block diagram of a computer system for migrating data objects from a first repository product to a second repository product in accordance with an embodiment of the present invention.

One embodiment is a system that allows a user to migrate first data objects from a first repository product to a second repository product. Within the first repository, the first data objects may be described and related to each other using a first logical model. However, once the first data objects are migrated to the second repository product, the first data objects may be described by a second logical model that is different than the first logical model. For example, Oracle Enterprise Repository 11g ("11g") uses a logical model that is different than the logical model used by Oracle Enterprise Repository 12c ("12c"). 11g and 12c are object-relational databases. As such, in order to enable the first data objects to be properly stored within the second repository product, one embodiment maps each of the first data objects to a second data object within the second logical model of the second repository product. By mapping each data object from one logical model to another logical model, all of the relationships among the different data objects can be preserved.

As previously discussed, a first repository product (e.g., Oracle Enterprise Repository 11g) may use a technology stack that is substantially different than a second repository product (e.g., Oracle Enterprise Repository 12c). Because the first repository product may use a different technology stack and a different logical model as compared to the second repository product, the second repository product may not be compatible with the first repository product. For example, when a major product release occurs, although users may wish to migrate their data objects that are stored within an original repository product to the newly released repository product, the newly released repository product may be a complete rewrite of the original repository product (i.e., the new product may be very different from the original product). When there are differences between the original product and the new product, it may be difficult to migrate data objects from the original product to the new product. As such, a user that wishes to switch from using Oracle Enterprise Repository 11g to Oracle Enterprise Repository 12c may have difficulties migrating data between the two products, due to the incompatibilities between the two products.

The approaches of the prior art are generally directed to migrating data objects from an original repository product to a new repository product, where the new repository product uses a logical model and technology stack that are similar to those used by the original repository product. When migrating data objects from an original repository product to a similar new repository product, the prior art generally successfully facilitated the migration by slightly modifying the data objects contained by the original repository product to fit the new repository product. For example, the prior art may add new fields to the data objects so that the data objects can be more suitably stored within the new repository product. The solutions offered by the prior art are generally only applicable if the original repository product and the new repository product use similar logical models.

However, in the event that the logical-model/technology-stack used by the original repository product is not similar to the logical-model/technology-stack used by the new repository product, the migration of data objects between the original repository product and the new repository product cannot be successfully facilitated by merely slightly modifying the data objects. Under such circumstances, the prior art generally directs a user to re-enter all of the data objects into the new repository product. Some other approaches of the prior art attempt to migrate the data objects from the original repository product to the new repository product by mapping the data objects of the original repository product to the data objects of the new repository product. However, the mappings performed by the prior art are generally ineffective in accurately mapping all of the data objects between the two repository products.

In contrast with the prior art, one embodiment allows a user to migrate data objects from one repository product to another repository product by mapping first data objects, described by a first logical model, to second data objects, described by a second logical model, while preserving all of the relationships among the different first data objects.

FIG. 1 is an overview block diagram of a computer system 100 for migrating data objects from a first repository product 17 to a second repository product 27 in accordance with an embodiment of the present invention. The functionality of system 100 can be implemented as a distributed system. System 100 includes a bus 12 or other communication mechanism for communicating information, and a processor 22 coupled to bus 12 for processing information. Processor 22 may be any type of general or specific purpose processor. System 100 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 100 further includes a communication device 20, such as a network interface card, to provide access to a network. Therefore, a user may interface with system 100 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 100.

In one embodiment, memory 14 stores software modules that provide functionality when executed by processor 22. The modules include an operating system 15 that provides operating system functionality for system 100. The modules further include migrating data objects module 16 that allows a user to migrate data objects from a first repository product 17 to a second repository product 27, as disclosed in more detail below. Second repository product 27 may be a part of another computer system 120. System 100 can be part of a larger system, such as a service-oriented architecture ("SOA") governance solution from Oracle Corporation, for example. Therefore, system 100 will typically include one or more additional functional modules 18 to include additional functionality, such as data processing functionality for exporting data objects to and from repositories. First repository product 17 can be coupled to bus 12 to store data used with modules 16 and 18.

As described above, one embodiment allows a user to migrate lifecycle data objects from a first repository product to a second repository product. Lifecycle data may be generally understood as data relating to a project. The data may describe a product development process of the project. Lifecycle data may allow users to more effectively manage a project. Lifecycle data can be data relating to access control, role assignment, workflow enforcement, and/or policy enforcement. The process of a lifecycle can be defined into a plurality of stages. The process of a lifecycle can progress from one stage to another stage once certain pre-defined criteria are met. The criteria can be defined by various stakeholders which have certain specific roles.

To effectively migrate lifecycle data objects between a first repository product and a second repository product, where the lifecycle data objects are described within the first repository using a first logical model, one embodiment of the present invention uses an extensible markup language ("XML") schema to describe the first logical model. As such, the XML schema describes the lifecycle data objects as well as the relationships between these objects. In one embodiment, the XML schema describes 11g project lifecycle data objects in a high-level, object-oriented way. In one embodiment, the data objects and the relationships between the data objects are preserved by the XML schema, with each data object having its own unique identifier.

Figure 2:
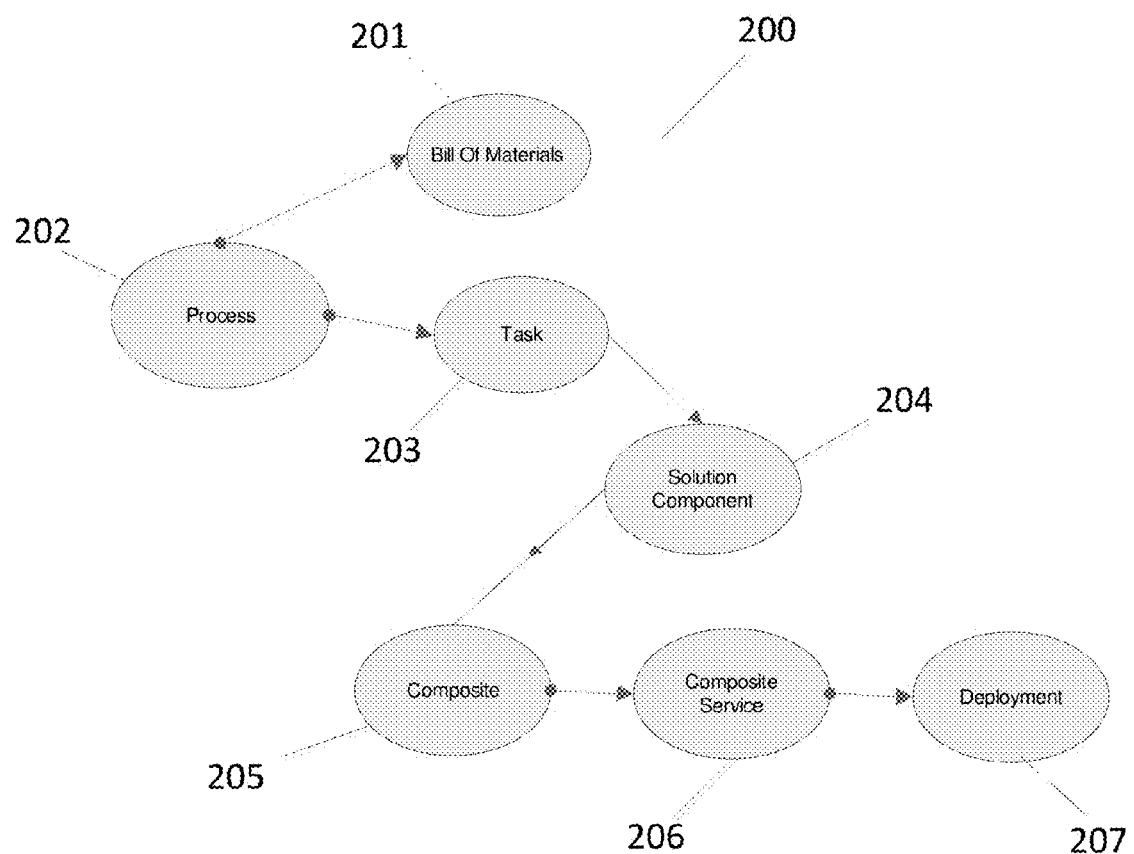
FIG. 2 illustrates a first logical model, as represented by a schema, in accordance with one embodiment.

FIG. 2 illustrates a first logical model, as represented by a schema 200, in accordance with one embodiment. As described above, in one embodiment, an XML schema is used to describe the first logical model. As described above, the first logical model can capture project lifecycle data objects, their attributes, and the relationships among the data objects. Each of the data objects can have a universal unique identifier ("UUID"). The project lifecycle objects are represented within XML schema 200.

At a high level, XML schema 200 comprises project lifecycle data objects including: processes 202, tasks 203, solution components 204, and bill of materials ("BOM") 201, for example. Process object 202 can be an object that models a project or business process. Process object 202 can comprise of one or more business task objects 203. Each task defines a business operation needed to complete the overall project goal. Task objects 203 can be comprised of solution components 204. Solution components are the functional definitions of the related business tasks' technical implementations. BOM object 201 can be used to describe a list of needed objects for building and deploying a project. Business projects have both a functional and operational side to them: the functional side is driven by use cases, while the operational side is concerned with the specific technical components needed to fulfill the use case.

To complete the operational side of a project lifecycle, the XML schema can use objects including composites 205, composite services 206, and deployments 207. Composite 205 is a container that groups services being used to implement a project or business process, and it fulfills the functional definition of the related solution. Composite services 206 expose the web service interface to calling applications. Deployments 207 provide the actual running instances of the composites.

Figure 3:
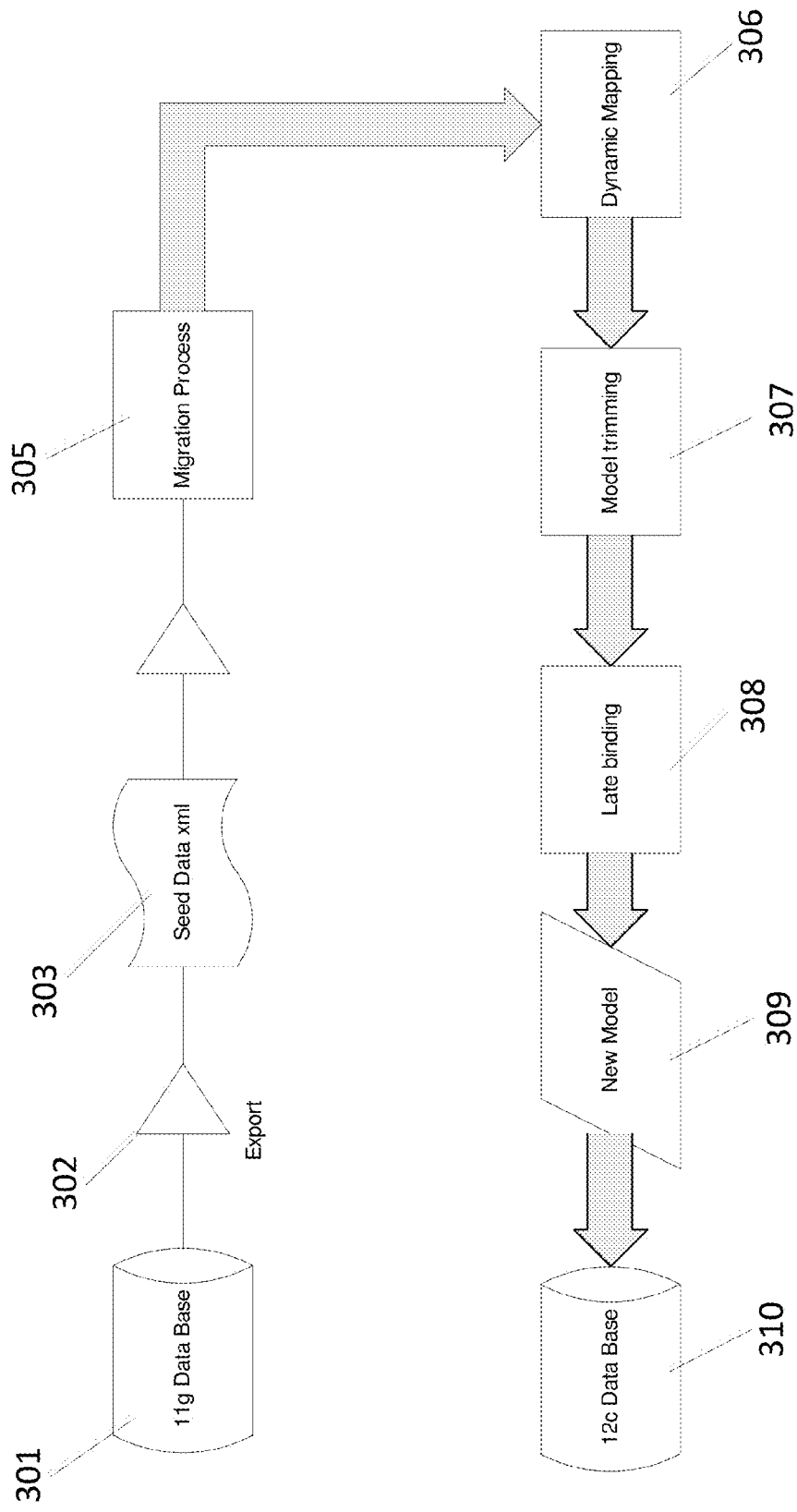
FIG. 3 illustrates a process of migrating data objects in accordance with one embodiment.

FIG. 3 illustrates a process of migrating data objects in accordance with one embodiment. In one embodiment, to migrate first data objects from the first repository product 301 to the second repository product 310, the first data objects are exported 302 from the first repository product. As described above, one embodiment can use an XML schema to describe a first logical model of the first data objects during the migration process. The XML schema can be considered to be XML seed data 303. Once the first data objects of the first logical model are described by the XML schema, the migration process 305 can begin. The first data objects of the first repository are mapped to second data objects of the second repository in a manner that preserves the first data objects and the relationships between the first data objects. In one embodiment, this mapping process involves dynamic mapping 306, model trimming 307, and late binding 308.

In one embodiment, dynamic mapping 306 identifies what each first data object within the first logical model of the first repository product 301 will map to within the second logical model of the second repository product 310. To accomplish dynamic mapping 306, one embodiment creates an internal object mapping. For example, an 11g Process can be mapped to a 12c Project, an 11g Task can be mapped to a 12c Functional Activity, etc. One embodiment then dynamically regenerates a new set of universal identifiers and stores a hash of data objects using their unique identifiers for later relationship identification and mappings. In one embodiment, a hash of data objects is a mapping of each of the data objects to data of another set.

In one embodiment, model trimming 307 is used to trim the structures of the first data objects of the first repository products so that they may suitably stored in the second repository. For example, one embodiment can trim the structures of 11g data objects to fit into the logical model of a 12c repository. In one embodiment, trimming can occur during runtime. Because some of the structures of the first data objects within the first logical model are different than the structures of the second data objects within the second logical model, one embodiment performs model trimming 307 by performing some data modification/data transformation on the first data objects of the first logical model. For example, in 11g, solution component relationships are modeled by a tree structure. If model trimming 307 is applied to the solution component relationships, model trimming 307 can flatten this tree structure and store it within a container-type of relationship. In 11g, the tree structure determined the uniqueness of the solution component; after the tree structure is flattened during migration, a subset of the solution component's attributes will uniquely identify this asset instead.

In one embodiment, a late binding process 308 can be used to identify the first lifecycle data objects that are being moved over from the first logical model, and to create appropriate new entities in the second logical model. Once all the necessary new entities are created, a new and complete second logical model 309 will have been generated for the second repository 310. In one embodiment, late-binding process 308 can also be used to uniquely identify attributes of the first data objects within the first repository product to establish placeholders for them within the second repository product. These placeholders can be used later when publishing the first data objects from the first repository product to the second repository product. In one embodiment, the publishing of the first data objects can be performed via a separate harvesting process. The placeholders enable first data objects to be carried over from the first repository product to the second repository product during migration, even though portions of the first data objects are to be brought into the second repository product via a separate process at a later time. In one embodiment, most composite objects are handled with late binding. With late binding 308, composites that are separately harvested at a later time can still use the same unique attributes to find related lifecycle projects. One embodiment can also leverage default values, populate enterprise-level attributes, and create repository projects.

In one embodiment, certain utility tools enable the exporting of the first data objects into the XML schema, and enable the remapping of the first data objects from the first logical model to the second logical model. In one embodiment, users do not need to perform any low-level database adjustments. The XML schema preserves the high-level product data. In one embodiment, a utility tool will perform runtime mapping and generate the second logical model. For example, in one embodiment, the utility tool generates the second logical model within the second repository product.

Figure 4:
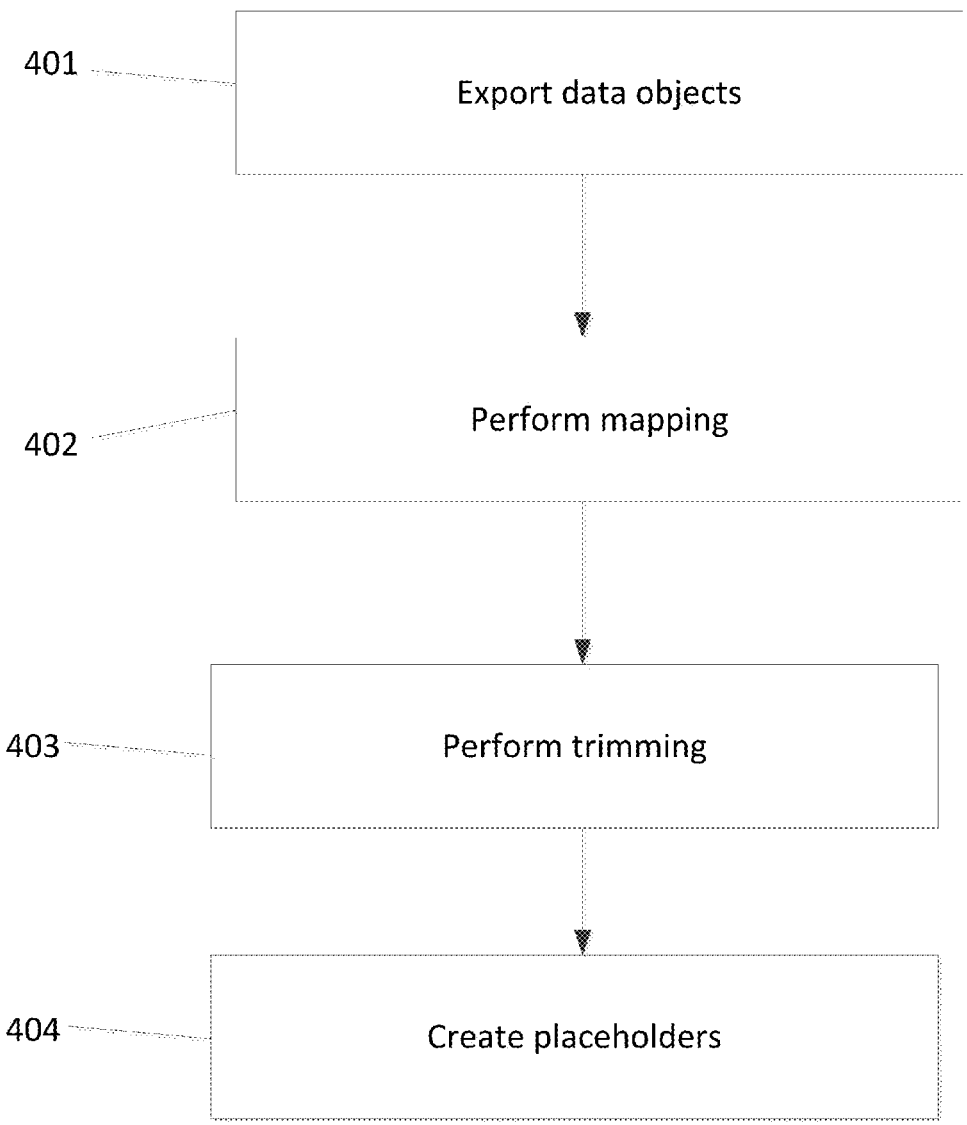
FIG. 4 is a flow diagram of the functionality of the migrating data objects module of FIG. 1 in accordance with one embodiment.

FIG. 4 is a flow diagram of the functionality of the migrating data objects module 16 of FIG. 1 in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 401, one embodiment exports first data objects from a first repository product. As previously described, one embodiment can use an XML schema to describe a first logical model that describes the first data objects. The first data objects exported from the first repository can be lifecycle data objects.

At 402, one embodiment maps the first data objects to second data objects of a second repository product. As previously described, the first data objects of the first repository can be mapped to second data objects of the second repository in a manner that preserves the first data objects and the relationships between the first data objects.

At 403, one embodiment performs trimming of the first data objects. As previously described, trimming can comprise data modification on the first data objects so that the first data objects can be migrated to the corresponding second data objects of the second repository product.

At 404, one embodiment creates placeholders for the first data objects for later deployment binding. As previously described, these placeholders can be used later when publishing the first data objects from the first repository product to the second repository product.

One embodiment uses an XML definition file to define a structure for the project XML seed data files such as XML seed data 303 of FIG. 3. In one embodiment, the XML definition file is expressed as follows:

```
<?xml version="1.0" encoding="windows-1252"?>
<xsd:schema xmlns:xsd="http://www.w3.org/2001/XMLSchema" xmlns="http://xml.oracle.com/AIA/PLWBOM/V1"
targetNamespace="http://xml.oracle.com/AIA/PLWBOM/V1" elementFormDefault="qualified">
    <xsd:element name="PLW">
        <xsd:complexType>
            <xsd:sequence>
                <xsd:element name="Process">
                    <xsd:annotation>
                        <xsd:documentation>Project LifeCycle WorkBench Seed Data Schema</xsd:documentation>
                    </xsd:annotation>
                    <xsd:complexType>
                        <xsd:sequence>
                            <xsd:element name="ProcessDetail" type="ProcessType"/>
                            <xsd:element name="ProcessUuid" type="xsd:string"/>
```

-continued

```
type="xsd:string"/>
            <xsd:element name="TaskDetail" type="TaskType"/>
            <xsd:element name="Scope" type="xsd:string"/>
            <xsd:element name="SvccompId" type="xsd:string" minOccurs="0" maxOccurs="unbounded"/>
          </xsd:sequence>
        </xsd:complexType>
      </xsd:element>
      <xsd:element name="TaskBom" minOccurs="0" maxOccurs="unbounded">
        <xsd:complexType>
          <xsd:sequence>
            <xsd:element name="TaskBomDetail" type="TaskType"/>
            <xsd:element name="TaskBomSource" type="xsd:string"/>
            <xsd:element name="SvccompBomId" type="xsd:string" minOccurs="0" maxOccurs="unbounded"/>
          </xsd:sequence>
        </xsd:complexType>
      </xsd:element>
      <xsd:element name="SvccompBomDetail" type="SvccompType"/>
      <xsd:element name="SvccompBomId" type="xsd:string"/>
      <xsd:element name="CompositeId" type="xsd:string"/>
      <xsd:element name="SvccompDetail" type="SvccompType"/>
      <xsd:element name="ReusedServiceObjectType" type="xsd:string" minOccurs="0"/>
      <xsd:element name="ReusedServiceObjectID" type="xsd:string" minOccurs="0"/>
      <xsd:element name="CompositeXML" type="xsd:hexBinary" minOccurs="0"/>
      <xsd:element name="CompositeRevID" type="xsd:hexBinary" minOccurs="0"/>
            <xsd:element name="ParentProcessUuid"
            <xsd:element name="Task" minOccurs="0" maxOccurs="unbounded">
              <xsd:complexType>
                <xsd:sequence>
                  <xsd:element
                  <xsd:element
                  <xsd:element
                </xsd:sequence>
              </xsd:complexType>
            </xsd:element>
            <xsd:element name="ProcessBom" minOccurs="0">
              <xsd:complexType>
                <xsd:sequence>
                  <xsd:element name="ProcessBomDetail" type="ProcessType"/>
                  <xsd:element name="BomStatus" type="xsd:string"/>
                  <xsd:element
                </xsd:sequence>
              </xsd:complexType>
            </xsd:element>
            <xsd:element name="SvccompBom" minOccurs="0" maxOccurs="unbounded">
              <xsd:complexType>
                <xsd:sequence>
                  <xsd:element
                  <xsd:element
                  <xsd:element
                </xsd:sequence>
              </xsd:complexType>
            </xsd:element>
            <xsd:element name="Svccomp" minOccurs="0" maxOccurs="unbounded">
              <xsd:complexType>
                <xsd:sequence>
                  <xsd:element name="SvccompDetail"
                  <xsd:element name="ReusedServiceObjectType"
                  <xsd:element name="ReusedServiceObjectID"
                </xsd:sequence>
              </xsd:complexType>
            </xsd:element>
            <xsd:element name="Composite" minOccurs="0" maxOccurs="unbounded">
              <xsd:complexType>
                <xsd:sequence>
                  <xsd:element name="CompositeDetail">
                    <xsd:complexType>
                      <xsd:complexContent>
                        <xsd:extension base="CompositeType"/>
                      </xsd:complexContent>
                    </xsd:complexType>
                  </xsd:element>
                  <xsd:element name="CompositeXML"
                  <xsd:element name="CompositeRevID"
                  <xsd:element name="CompositeServiceElem"
```

```
minOccurs="0" maxOccurs="unbounded">
                                                        <xsd:complexType>
                                                            <xsd:sequence>
                                                                <xsd:element
name="ServiceElementID" type="xsd:string"/>
                                                                <xsd:element
name="CompositeServiceType" type="xsd:string"/>
                                                                <xsd:element
name="CompositeServiceName" type="xsd:string"/>
                                                                <xsd:element
name="ServiceElementXML" type="xsd:hexBinary"/>
                                                                <xsd:element
name="Audit" type="CommonAuditType"/>
                                                                <xsd:element
name="DeployAttributeValue" type="DeployAttributeValueType" minOccurs="0" maxOccurs="unbounded"/>
                                                            </xsd:sequence>
                                                        </xsd:complexType>
                                                    </xsd:element>
                                                    <xsd:element name="DeployAttributeValue"
type="DeployAttributeValueType" minOccurs="0" maxOccurs="unbounded"/>
                                                </xsd:sequence>
                                            </xsd:complexType>
                                        </xsd:element>
                                        <xsd:element name="ServiceElement" minOccurs="0"
maxOccurs="unbounded">
                                            <xsd:complexType>
                                                <xsd:sequence>
                                                    <xsd:element name="ServiceElementDetail"
type="ServiceElementType"/>
                                                </xsd:sequence>
                                            </xsd:complexType>
                                        </xsd:element>
                                    </xsd:sequence>
                                    <xsd:attribute name="processCode"/>
                                    <xsd:attribute name="version"/>
                                    <xsd:attribute name="createDate"/>
                                    <xsd:attribute name="uuid"/>
                                </xsd:complexType>
                            </xsd:element>
                            <xsd:complexType name="CommonAuditType">
                                <xsd:sequence>
                                    <xsd:element name="CreatedBy" type="xsd:string"/>
                                    <xsd:element name="CreationDate" type="xsd:string"/>
                                    <xsd:element name="LastUpdatedBy"/>
                                    <xsd:element name="LastUpdateDate"/>
                                    <xsd:element name="ObjectVersionNumber"/>
                                </xsd:sequence>
                            </xsd:complexType>
                            <xsd:complexType name="ProcessType">
                                <xsd:sequence>
                                    <xsd:element name="ProcessName" type="xsd:string"/>
                                    <xsd:element name="ProcessDesc" type="xsd:hexBinary"/>
                                    <xsd:element name="ProcessAssumption" type="xsd:hexBinary"/>
                                    <xsd:element name="ProcessSource" type="xsd:string"/>
                                    <xsd:element name="ProcessIndustry" type="xsd:string"/>
                                    <xsd:element name="ProcessCode" type="xsd:string"/>
                                    <xsd:element name="ProcessType" type="xsd:string"/>
                                    <xsd:element name="Status" type="xsd:string"/>
                                    <xsd:element name="Version" type="xsd:string"/>
                                    <xsd:element name="Audit" type="CommonAuditType"/>
                                </xsd:sequence>
                            </xsd:complexType>
                            <xsd:complexType name="TaskType">
                                <xsd:sequence>
                                    <xsd:element name="TaskID" type="xsd:string"/>
                                    <xsd:element name="TaskName" type="xsd:string"/>
                                    <xsd:element name="TaskDesc" type="xsd:hexBinary"/>
                                    <xsd:element name="TaskUuid" type="xsd:string"/>
                                    <xsd:element name="Audit" type="CommonAuditType"/>
                                </xsd:sequence>
                            </xsd:complexType>
                            <xsd:complexType name="SvccompType">
                                <xsd:sequence>
                                    <xsd:element name="SvccompID" type="xsd:string"/>
                                    <xsd:element name="SvccompType" type="xsd:string"/>
                                    <xsd:element name="SvccompName" type="xsd:string"/>
                                    <xsd:element name="SvccompDesc" type="xsd:hexBinary"/>
                                    <xsd:element name="SvccompAssumption" type="xsd:hexBinary"/>
                                    <xsd:element name="ProductPillar" type="xsd:string"/>
```

-continued

```
            <xsd:element name="ProductFamily" type="xsd:string"/>
            <xsd:element name="ProductCode" type="xsd:string"/>
            <xsd:element name="SvccompGUID" type="xsd:string"/>
            <xsd:element name="Audit" type="CommonAuditType"/>
        </xsd:sequence>
    </xsd:complexType>
    <xsd:complexType name="CompositeType">
        <xsd:sequence>
            <xsd:element name="CompositeID" type="xsd:string"/>
            <xsd:element name="CompositeName" type="xsd:string"/>
            <xsd:element name="Source" type="xsd:string"/>
            <xsd:element name="Audit" type="CommonAuditType"/>
        </xsd:sequence>
    </xsd:complexType>
    <xsd:complexType name="ServiceElementType">
        <xsd:sequence>
            <xsd:element name="ServiceElementID" type="xsd:string"/>
            <xsd:element name="ServiceElementType" type="xsd:string"/>
            <xsd:element name="ServiceName" type="xsd:string"/>
            <xsd:element name="OperationName" type="xsd:string"/>
            <xsd:element name="Namespace" type="xsd:string"/>
            <xsd:element name="ProductPillar" type="xsd:string"/>
            <xsd:element name="ProductFamily" type="xsd:string"/>
            <xsd:element name="ProductCode" type="xsd:string"/>
            <xsd:element name="Audit" type="CommonAuditType"/>
        </xsd:sequence>
    </xsd:complexType>
    <xsd:complexType name="DeployAttributeValueType">
        <xsd:sequence>
            <xsd:element name="GroupNumber" type="xsd:string"/>
            <xsd:element name="DeployAttributeValue" type="xsd:string"/>
            <xsd:element name="DeployAttributeCode" type="xsd:string"/>
            <xsd:element name="Audit" type="CommonAuditType"/>
        </xsd:sequence>
    </xsd:complexType>
</xsd:schema>
```

As described above, certain embodiments are directed a system that allows a user to migrate data objects from one repository product to another repository product by mapping first data objects, described by a first logical model, to second data objects, described by a second logical mode, while preserving all of the relationships among the different first data objects.

As a result, embodiments provide a "smooth" migration process while incorporating the need to preserve data by creating intelligence to recreate similar objects in a new product. The high level objects that are generated preserve the logical model as well as the data between an old and new product. Embodiments include a general XML to describe the project lifecycle objects as well as the relationships between them. The XML preserves the project lifecycle model in a high-level, object oriented manner. Both the objects and relationships have their own unique identifiers. Further, dynamic mapping, model trimming and late binding methods are introduced in the migration process by one embodiment so that the project lifecycle objects can be recreated in the new model. One embodiment is specifically adapted for the transition of objects between 11g and 12c while preserving the 11g project lifecycle data.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to migrate first data objects from a first repository product to a second repository product, the migrating comprising:
    exporting the first data objects from the first repository product into a schema, the schema defining a logical model of the first data objects;
    mapping the first data objects to second data objects of the second repository product;
    trimming the first data objects so that the first data objects are modified and can be migrated to the second repository product;
    creating placeholders within the second repository product that uniquely identify attributes of each of the first data objects for later deployment binding; and
    publishing the first objects to the second repository product based on the created placeholders,
    wherein the first repository product uses a first logical model and the second repository product utilizes a second logical model.

2. The non-transitory computer readable medium of claim 1, wherein the first data objects comprise lifecycle data objects, and the logical model of the first data objects describes the first data objects and the relationships between the first data objects.

3. The non-transitory computer readable medium of claim 1, wherein the schema is an extensible markup language schema, and each first data object in the schema has a unique identifier.

4. The non-transitory computer readable medium of claim 1, wherein the schema comprises a process, a task, a solution component, and a bill of materials.

5. The non-transitory computer readable medium of claim 4, wherein relationships between solution components are modeled by a tree structure, and trimming the first data objects comprises flattening the tree structure.

6. The non-transitory computer readable medium of claim 1, wherein the first repository product is a first type of object-relational database, and the second repository product is a second type of object-relational database.

7. The non-transitory computer readable medium of claim 1, wherein the first repository product uses a first logical model having a first tree structure and the second repository product utilizes a second logical model having a second tree structure.

8. The non-transitory computer readable medium of claim 7, wherein the second tree structure is flatter than the first tree structure.

9. A method for migrating first data objects from a first repository product to a second repository product, the method comprising:
   exporting the first data objects from the first repository product into a schema, the schema defining a logical model of the first data objects;
   mapping the first data objects to second data objects of the second repository product;
   trimming the first data objects so that the first data objects are modified and can be migrated to the second repository product;
   creating placeholders within the second repository product that uniquely identify attributes of each of the first data objects for later deployment binding; and
   publishing the first objects to the second repository product based on the created placeholders,
   wherein the first repository product uses a first logical model and the second repository product utilizes a second logical model.

10. The method of claim 9, wherein the first data objects comprise lifecycle data objects, and the logical model of the first data objects describes the first data objects and the relationships between the first data objects.

11. The method of claim 9, wherein the schema is an extensible markup language schema, and each first data object in the schema has a unique identifier.

12. The method of claim 9, wherein the schema comprises a process, a task, a solution component, and a bill of materials.

13. The method of claim 12, wherein relationships between solution components are modeled by a tree structure, and trimming the first data objects comprises flattening the tree structure.

14. The method of claim 9, wherein the first repository product is a first type of object-relational database, and the second repository product is a second type of object-relational database.

15. A system for migrating first data objects from a first repository product to a second repository product, the system comprising:
   a processor;
   a memory coupled to the processor;
   an exporting module that exports the first data objects from the first repository product into a schema, the schema defining a logical model of the first data objects;
   a mapping module that maps the first data objects to second data objects of the second repository product;
   a trimming module that trims the first data objects so that the first data objects are modified and can be migrated to the second repository product;
   a creating module that creates placeholders within the second repository product that uniquely identify attributes of each of the first data objects for later deployment binding; and
   a publishing module that publishes the first objects to the second repository product based on the created placeholders,
   wherein the first repository product uses a first logical model and the second repository product utilizes a second logical model.

16. The system of claim 15, wherein the first data objects comprise lifecycle data objects, and the logical model of the first data objects describes the first data objects and the relationships between the first data objects.

17. The system of claim 15, wherein the schema is an extensible markup language schema, and each first data object in the schema has a unique identifier.

18. The system of claim 15, wherein the schema comprises a process, a task, a solution component, and a bill of materials.

19. The system of claim 17, wherein relationships between solution components are modeled by a tree structure, and trimming the first data objects comprises flattening the tree structure.

* * * * *